United States Patent [19]

Cheesman

[11] 4,167,297

[45] Sep. 11, 1979

[54] MOUNTING ASSEMBLY FOR A JOURNAL BEARING

[75] Inventor: William D. Cheesman, Houston, Tex.

[73] Assignee: Royce Equipment Company, Houston, Tex.

[21] Appl. No.: 880,113

[22] Filed: Feb. 22, 1978

[51] Int. Cl.² .............................................. F16C 33/30
[52] U.S. Cl. ................................. 308/187; 308/187.1; 308/207 R; 308/216; 308/236
[58] Field of Search ............. 308/236, 18, 187, 187.1, 308/216, 187.2, 36.1–36.5, 8.2, 208, 207 R, 207 A; 198/835, 701

[56] References Cited

U.S. PATENT DOCUMENTS

| | | | |
|---|---|---|---|
| 1,699,330 | 1/1929 | Gayman | 308/236 X |
| 2,166,391 | 7/1939 | Borland | 308/236 X |
| 2,473,267 | 6/1949 | Wightman | 308/236 |
| 3,702,720 | 11/1972 | Hallerback | 308/236 |

Primary Examiner—Douglas C. Butler
Attorney, Agent, or Firm—Pravel, Gambrell, Hewitt, Kirk, Kimball & Dodge

[57] ABSTRACT

A mounting assembly for a journal bearing that is adapted to be disposed between a rotating headshaft and a frame member, with the mounting assembly including a bearing cone, resilient compression rings, and outside seal retainer members disposed about the rotating headshaft with the resilient compression rings compressively positioned between the bearing cone and outside seal retainer members to frictionally secure the bearing cone along the rotating headshaft upon axial rotation of the outside seal retainer members with respect to the bearing cone.

12 Claims, 2 Drawing Figures

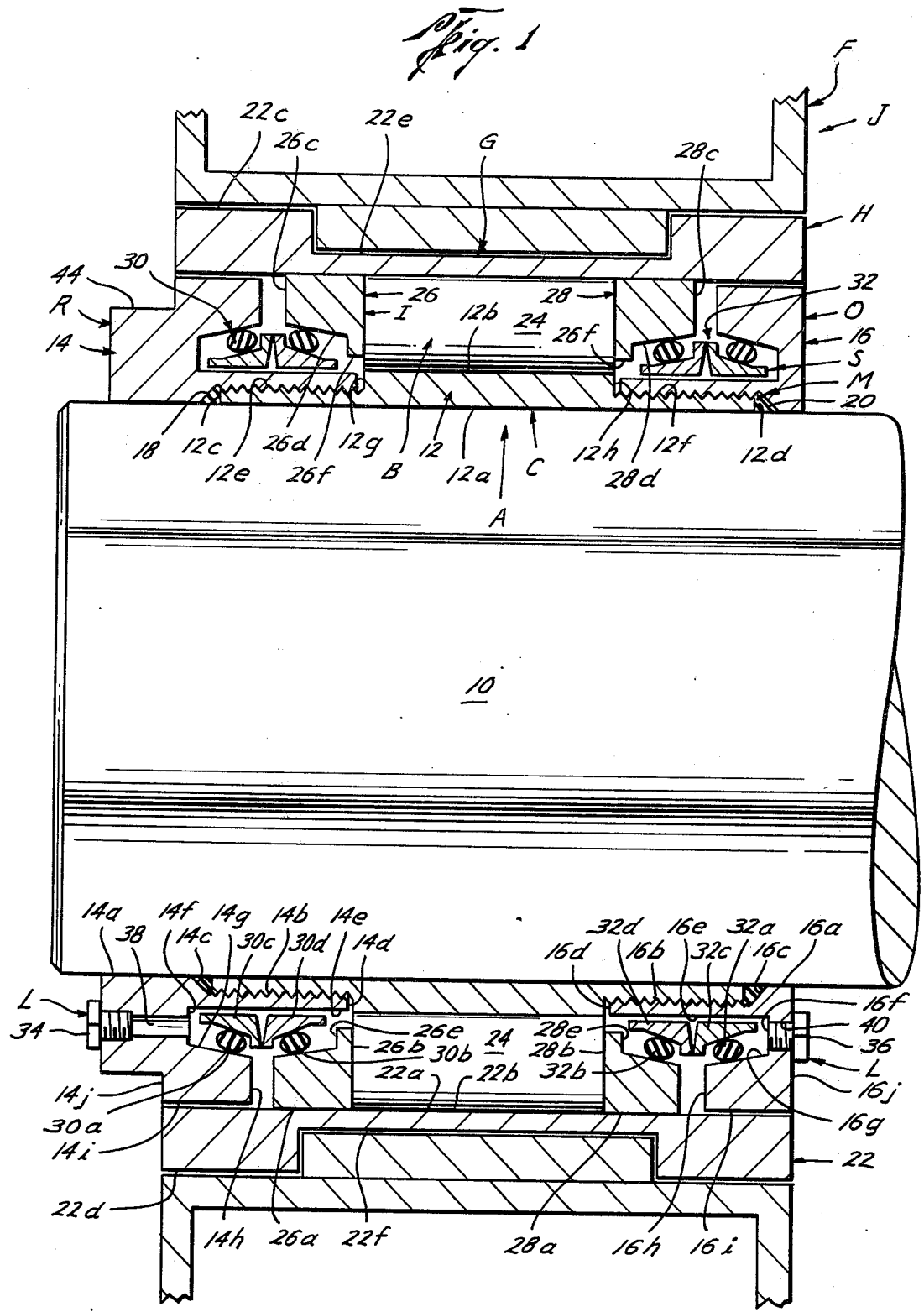

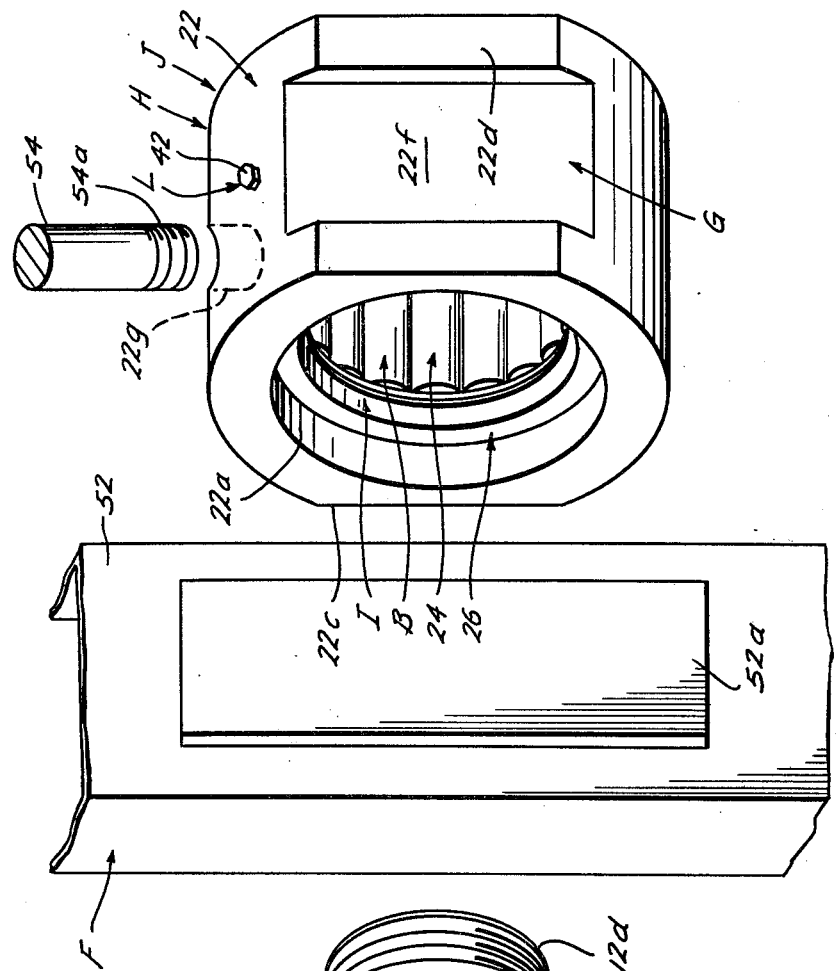

4,167,297

MOUNTING ASSEMBLY FOR A JOURNAL BEARING

BACKGROUND OF THE INVENTION

The field of this invention is journal bearings, particularly of the type having means for securing such journal bearings along a rotating headshaft.

In the prior art, there are many different types of journal bearings, many of which use a variety of techniques for securing the journal bearing with respect to the rotating member and the fixed member which include such structures generally as disclosed in U.S. Pat. Nos. 3,989,126; 3,767,279; 3,511,492; 2,649,922; and, 2,011,878. Some prior art references disclose the use of various types of clamping tapers for securing a bearing to a shaft, such as those disclosed in U.S. Pat. Nos. 3,918,779; 3,656,785; 3,338,600; and, 786,315. U.S. Pat. Nos. 3,924,957; 2,835,519; and, 3,007,753 all disclose the use of split rings and eccentrics to secure the inner race of the journal bearing to a shaft. Other prior techniques disclose the use of locking rings for securing a bearing to a shaft such as in U.S. Pat. No. 2,873,128 wherein a locking band is disposed between the inner race and the shaft. Alternative techniques include that such as disclosed in U.S. Pat. No. 1,043,631 wherein a locking ring is disposed about a mounting sleeve to secure the bearing to the shaft.

However, heretofore critically machined shafts to receive the inner race of the bearing has caused difficulties because of expense involved in keeping such critical tolerances and in many instances require machined lips on the shaft to abut the bearing race for locating the bearing along the shaft. In an attempt to eliminate the machining of the shaft requirements and the specifics regarding where the bearing should in fact be located along the shaft, some prior art suggests the use of resilient clamping plugs capable of frictionally engaging a shaft for securing a bearing to the shaft such as those disclosed in U.S. Pat. No. 2,166,391. Similarly, in U.S. Pat. No. 2,473,267, a resilient annular ring is used to engage the outer race of a bearing for helping to secure the bearing in its proper position and prevent rotation of the outer race of the bearing with respect to the housing within which it is mounted. Lastly, U.S. Pat. No. 3,702,720 discloses the use of a resilient ring to be disposed within a groove in the shaft for cooperating with the surface of the bearing seat under compression to prevent rolling of the bearing ring in its position. However, the disclosed structure is not intended to be used for securing the ring along the shaft, for to operate as intended, a cooperating groove is necessary. So far as known, no threaded compression structure is disclosed in the prior art nor any equivalent thereof that allows the indiscriminate placing of a journal bearing along a rotating headshaft.

SUMMARY OF THE INVENTION

The present invention relates to a new and improved mounting assembly for a journal bearing that is adapted to be disposed between a rotating headshaft and a frame member, the mounting assembly including a bearing cone having radial end portions and outer annular threaded surfaces adjacent thereto, with the outer annular threaded surfaces adapted to engage corresponding threaded surfaces formed with outside seal retainer members. Resilient compression members are disposed between the radial end portions of the bearing cone and the outside seal retainer members for frictionally engaging the headshaft for locating the bearing cone axially along the headshaft upon compression of the resilient compression members in response to axial threaded movement of the outside seal retainer members with respect to the bearing cone.

BRIEF DESCRIPTION OF THE DRAWINGS

FIG. 1 is an elevational, sectional view of the mounting assembly of the present invention, showing a journal bearing located upon a headshaft; and, FIG. 2 is an isometric, exploded view of the mounting assembly and journal bearing therefor, showing a fragmentary portion of a frame member.

DESCRIPTION OF THE PREFERRED EMBODIMENT

Referring to the drawings, the letter A designates the mounting assembly of the preferred embodiment of this invention. The mounting assembly A cooperates with journal bearing J. The journal bearing J is adapted to be disposed between a rotating headshaft 10 and a frame member F. The mounting assembly A includes generally a bearing cone C, outside seal retainer means O, resilient compression means M, inside seal retainer means I, seal means S, and bearing means B, all adapted to cooperate with the housing H of the mounting assembly A of the journal bearing J of the present invention. Unless otherwise specified, it is preferred that the components of this invention be made of any suitable high-strength materials such as stainless steels, alloys, other types of steel or other high-strength non-ferrous materials capable of taking heavy stresses and strain without failure thereof.

The mounting assembly A of the present invention is adapted to be used for mounting the journal bearing J on a rotating headshaft 10. The headshaft 10 may be of any suitable rotating shaft and may include such shafts as those used for water purification devices, the headshafts for bucket elevators, the headshaft for coal elevators and conveyors, and the like.

The mounting assembly A for the journal bearing J includes a bearing cone C. Preferably, the bearing cone C is of a substantially cylindrical configuration and includes bearing cone 12. The bearing cone 12 is formed having an inner cone surface 12a to be disposed about the rotating headshaft 10 and having an inside diameter corresponding substantially to the outside diameter of the rotating headshaft 10. The bearing cone 12 further includes an outer annular bearing surface 12b having a diameter greater than the inner cone surface 12a and is adapted to engage the bearing means B as discussed more fully hereinbelow.

First and second radial end portions 12c, 12d are formed at each end of the bearing cone 12. First and second outer annular threaded surfaces 12e, 12f, respectively, are formed with the bearing cone 12 with each of the first and second outer annular threaded surfaces 12e, 12f being of a diameter less than the outer annular bearing surface 12b but greater than the diameter of inner cone surface 12a. Preferably, the first outer annular threaded surface 12e is formed between the first radial end portion 12c and annular lip 12g formed adjacent the outer annular bearing surface 12b. Similarly, preferably, the second outer annular threaded surface 12f is formed between the second radial end portion 12d and annular lip 12h formed adjacent the outer annular bearing surface 12b. It will be appreciated that the inner cone surface 12a of bearing cone 12 is not press fit onto headshaft 10, but rather has sufficient clearance that the bearing cone 12 may be slipped onto the headshaft 10 without heating or pressing the bearing cone 12 thereonto. This is preferred in order to allow freedom of movement of the bearing cone 12 along the axis of the headshaft 10 for ease in positioning the bearing cone 12 with respect to the headshaft 10.

The mounting assembly A of the journal bearing J further includes outside seal retainer means O. The outside seal retainer means O includes outside seal retainers 14 and 16. Preferably, the outside seal retainers 14, 16 each have an inner annular surface 14a, 16a, respectively, of a diameter substantially the same as the inner cone surface 12a of the bearing cone 12. First and second inner threaded surfaces 14b, 16b, respectively, are formed adjacent to inner annular surfaces 14a, 16a of first and second outside seal retainers 14, 16. Inner threaded surfaces 14b, 16b are formed to threadedly engage the first and second outer annular threaded surfaces 12e, 12f, respectively, of the bearing cone 12 for threaded axial movement therebetween. Inclined compressing surface 14c is formed between inner annular surface 14a and inner threaded surface 14b while an inclined compressing surface 16c is formed between inner annular surface 16a and inner threaded surface 16b. The incline of such inclined compressing surfaces 14c, 16c may be of any suitable angle with respect to the axis of the rotating headshaft 10, however, it is preferred that such angle be of substantially 45° as shown in FIG. 1. The first outside seal retainer 14 further includes end portion 14d, chamber surface 14e (which is preferably substantially parallel to inner annular surface 14a), chamber surface 14f, sealing surface 14g, end surface 14h, outer annular surface 14i and outside surface 14j. Similarly, second outside seal retainer 16 includes end portion 16d, chamber surface 16e (which is preferably substantially parallel to inner annular surface 16a), chamber surface 16f, sealing surface 16g, end surface 16h, outer annular surface 16i, and outside surface 16j, all of which will be discussed more fully hereinbelow.

The mounting assembly A of the journal bearing J of the present invention further includes resilient compression means M adapted for mounting on the headshaft 10. The resilient compression means M includes first resilient compression members 18 and second resilient compression member 20. Preferably, the resilient compression members 18, 20 are of a resilient, elastomeric material and may include any suitable type of compressible type gasket material. This may include O-rings or any suitable substitute therefor. It is preferred that O-rings be used and be sized accordingly such that they may be of a diameter slightly less than that of the rotating headshaft 10 such that they may be slipped onto the headshaft 10 while encountering some frictional resistance to movement along the axis of the rotating headshaft 10, and may be moved easily along the axis because of their inherent elastomeric, resilient characteristics. Further, such O-rings preferably are of diameter greater than radial end portions 12c, 12d of bearing cone 12.

The first resilient compression member 18 is adapted to be disposed between the first outside seal retainer 14 and the bearing cone 12, adjacent and between inclined compressing surface 14c and first radial end portion 12c, respectively. Similarly, second resilient compression member 20 is adapted to be disposed between second outside seal retainer 16 and the bearing cone 12, adjacent and between inclined compressing surface 16c and the second radial end portion 12d, respectively.

Threaded axial movement between threaded surfaces 14d, 12e, of the first outside seal retainer 14 with respect to the bearing cone 12, results in compression of the first resilient compression member 18 between inclined compressing surface 14c and first radial end portion 12c resulting in the resilient compression member 18 frictionally and securely engaging the headshaft 10. Similarly, threaded axial movement between threaded surfaces 16b, 12f of the second outside seal retainer 16 with respect to the bearing cone 12 results in compression of second resilient compression member 20 between inclined compressing surface 16c and second radial end portion 12d resulting in the resilient compression member 20 frictionally and securely engaging the headshaft 10. Thus, with first and second resilient compression members 18, 20 frictionally engaging the headshaft 10, the bearing cone 12 is axially located along and secured to the headshaft 10. Furthermore, because of the compressive, frictional engagement, in addition to securing the bearing cone 12 along the axis of the headshaft 10, the frictional engagement therebetween the first and second outside seal retainers 14, 16 and the radial end portions 12c, 12d of the bearing cone 12, respectively, by the resilient compression members 18, 20, the bearing cone 12 is secured with respect to the headshaft 10 such that the bearing cone 12 will not rotate with respect to the headshaft 10 when in the secured position. Thus, the resilient compression members 18, 20, when appropriately positioned and engaged, locate the bearing cone 12 securely along the axial length of the headshaft 10 and prevents rotation of the bearing cone 12 with respect to the headshaft 10.

The mounting assembly A of the journal bearing J includes housing H which is adapted to engage the frame member F. The housing H includes bearing housing 22 which is formed having a bore 22a therethrough. The bore 22a of the bearing housing 22 acts as the outer race adjacent 22b for the bearing means B that is disposed therebetween the bore 22a and the outer annular bearing surface 12b of the bearing cone 12. Accordingly, the diameter of the bore 22a must be slightly greater than the overall diameter of the bearing cone 12 and bearing means B combined.

The bearing housing 22 preferably is of a general cylindrical configuration as shown in FIG. 2 and further preferably includes truncated side portions 22c, 22d, with the truncated side portion 22c, 22d being substantially flat surfaces that are substantially parallel with one another. Preferably, guide surfaces 22e, 22f, being substantially parallel to side portions 22c, 22d, are formed with the bearing housing 22. The guide surfaces 22e, 22f are preferably of a U-shaped configuration, however, they may be of a multiple U-shape, V-shape or any other suitable configuration to accomplish the purposes hereinafter set forth and discussed more fully hereinbelow. The truncated side portions 22c, 22d and guide surfaces 22e, 22f together form the linear guide means G. The linear guide means G, being formed with the bearing housing 22, is useful for mounting the bearing housing 22 for adjustable linear movement of the journal bearing J along the frame member F without rotation of the housing H as more fully discussed hereinbelow.

The mounting assembly A of the journal bearing J of the present invention further includes bearing means B adapted to be disposed between and for engaging the bore 22a of the bearing housing 22 adjacent outer race 22b and the outer annular bearing surface 12b of the bearing cone 12. The bearing means B includes bearings 24, which as shown, are typical roller bearings. However, any suitable bearing may be used such as needle bearings, ball bearings or the like, depending upon the application and loads required. Further, suitable taper bearings may be used as long as the bore 22a of the bearing housing 22 and the outer annular bearing surface 12b are appropriately configured to receive same. Furthermore, it is preferred that the bearing means B be of such an axial length to correspond to the axial length of the outer annular bearing surface 12b of the bearing cone 12.

The mounting assembly A of the journal bearing J of the present invention further includes inside seal retainer means I mounted with the bore 22a of the bearing housing 22 adjacent to and for locating the bearing means B in the bearing housing 22. The inside seal retainer means I includes first and second inside seal retainers 26, 28. The first inside seal retainer 26 includes outer annular surface 26a which is adapted to snugly engage the bore 22a of the bearing housing 22, inner and outer radial surface 26b, 26c, respectively, seal surface 26d, radial lip 26e and inner annular surface 26f. In similar fashion, second inside seal retainer 28 includes outer annular surface 28a which is adapted to snuggly engage bore 22a of bearing housing 22, inner and outer radial surfaces 28b, 28c, respectively, seal surface 28d, radial lip 28e, and inner annular surface 28f. The outer annular surfaces 26a, 28a of inside seal retainers 26, 28 are adapted to engage and locate the bearing means B with respect to the housing H and bearing cone C, while similarly engaging bore 22a of bearing housing 22 with outer annular surfaces 26a, 28a, respectively. It is preferred that the outer annular surfaces 26a, 28a be of a slight press-resistance type fit to insure proper location of the bearing means B within the housing H. Furthermore, it is preferred that the inner annular surfaces 26f, 28f of the inside seal retainers 26, 28 be of a diameter slightly greater than that of the outer annular bearing surface 12b of the bearing cone 12 to insure that there be no engagement between the inside seal retainers 26, 28 and the bearing cone C during operation of the journal bearing J.

It will be appreciated that the outer annular surfaces 14i, 16i of the outside seal retainers 14, 16 of the outside seal retainer means O is of a diameter slightly less than that of the bore 22a through bearing housing 22. This permits rotation of the outside seal retainer means O, resilient compression means M, and bearing cone C with the rotating headshaft 10 without the outside seal retainer means O engaging the housing H.

The mounting assembly A of the journal bearing J further includes seal means S. The seal means S is adapted to be disposed between the inside seal retainer means I and outside seal retainer means O to prevent particulate contamination of the bearing means B within the housing H from outside sources and for retaining lubrication within the housing H to insure longevity of useful life of the bearing means B during rotation of the headshaft 10 with respect to the housing H. The seal means S includes seals 30, 32. Preferably, the seals designated generally 30, 32 are "Duo-Cone" seals as manufactured by Caterpillar Tractor Company of Peoria, Illinois 61629.

Typically, a "Duo-Cone" seal such as seal 30 includes two rubber sealing rings or torics 30a, 30b and two metal sealing rings 30c, 30d. Similarly, seal 32 includes rubber rings or torics 32a, and 32b and metal sealing rings 32c, 32d. As shown in FIG. 1, rubber toric 30a engages sealing surface 14g of the outside seal retainer 14 and also engages metal sealing ring 30c. Rubber toric 30b engages sealing surface 26d of the inside seal retainer 26 and metal sealing ring 30d. In similar fashion, rubber toric 32a engages sealing surface 16g of outside seal retainer 16 and metal sealing ring 32c while rubber toric 32b engages sealing surface 28d of inside seal retainer 28 and metal sealing ring 32d. It is intended that there is relative motion between the metal sealing rings 30c, 30d and 32c, 32d when the rotating headshaft 10 is in fact rotating, with the respective torics 30a, 30b, 32a, 32b providing sealable engagement of the metal sealing ring with the inside seal retainer means I and outside seal retainer means O. As a result thereof, toric 30a and metal sealing ring 30c as well as toric 32a and metal sealing ring 32c will rotate with their respective outside seal retainers 14, 16, bearing cone 12 and rotating headshaft 10 while toric 30b and metal sealing ring 30d as well as toric 32b and metal sealing ring 32d will remain stationary with respect to the housing H and frame F. Wear of the seal means S will accordingly occur between corresponding metal sealing rings 30c, 30d and 32c, 32d.

The mounting assembly A of the journal bearing J further includes lubricant fill means L mounted with the housing H to permit the addition of lubricant for and in fluid communication with the bearing means B as desired. The lubricant fill means L includes threaded bolts 34, 36 adapted to be received in suitably formed passageways 38, 40, respectively, formed in outside seal retainers 14, 16, respectively. Passageways 38, 40 preferably are in communication with chamber surfaces 14f, 16f, respectively, of the outside seal retainers 14, 16. Upon removal of threaded bolts 34, 36, suitable lubricant may be forced thereinto passageways 38, 40 for providing lubrication for the bearing means B. Such lubricant, when forced through passageway 38, results in filling the areas bounded by rubber toric 30a, therebetween metal sealing ring 30c and sealing surface 14g, chamber surfaces 14f, and 14e, therebetween metal sealing ring 30d and sealing surface 26d as limited by rubber toric 30b and flowing thereinto and adjacent the bearing means B. A similar lubricant flow path, being the mirror image, would be followed when lubricant is forced through passageway 40 upon removal of threaded bolt 36. The lubricant fill means F further includes fill means 42 (FIG. 2) formed with the housing H with such being appropriately threaded into bearing housing 22 and being in communication with the bearing means B by suitably formed passageways (not shown) for appropriately lubricating the bearing means B.

The mounting assembly A of the journal bearing J further includes anti-rotation means R for preventing rotation of the outside seal retainer means O when threading the inner threaded surfaces 14b, 16b of the first and second outside seal retainers 14, 16, respectively, onto the outer annular threaded surfaces 12e, 12f of the bearing cone 12. Preferably, the anti-rotation means R is formed with one of the outside seal retainer means O. As shown in FIGS. 1 and 2, the anti-rotation means R may take the form of hex head 44 formed with outside seal retainer 14. The hex head 44 may be integrally formed with the outside seal retainer 14 or may be suitably attached thereto as long as the hex head 44 has a suitable bore therethrough corresponding in size at least to the diameter of the rotating headshaft 10 to allow insertion therethrough. The hex head 44 may be firmly grasped by any suitable tool for rotation to secure the threading of the outside seal retainer means O with the bearing cone C to insure secure mounting of the bearing cone C with the rotating headshaft 10. It will be appreciated that any other suitable type of equivalent device for engaging the outside seal retainer means O may be used in order to accomplish this desired purpose and result.

It should be noted that preferably, the outside seal retainer 14 having the hex head 44 formed therewith is formed as is bearing cone 12 in such a fashion that the threaded engagement between threaded surfaces 14b, 12e, respectively, oppose rotation of the headshaft 10 such that the makeup between the outside seal retainer means O and bearing cone C remains secure during rotation of the rotating headshaft 10. It is further preferred that the threads between outside seal retainer means O and bearing cone C adjacent threaded surfaces 16b, 12f oppose the threaded direction of that between threaded surfaces 14b, 12e such that the tightening therebetween outside seal retainer 14 and the bearing cone 12 further results in increased threaded engagement between outside seal retainer 16 and bearing cone 12 to insure positive locking therebetween.

The journal bearing J is adapted to be disposed between the rotating headshaft 10 and frame member F. The frame member F may be of any suitable configuration; however, as shown in FIG. 2, the frame member F includes a channel member 52 having guide member 52a formed therewith. The guide member 52a is formed of a suitable configuration to be received by the guide means G of the journal bearing, which includes the guide surface 22f formed with the bearing housing 22. Thus, accordingly inasmuch as the guide member 52a is of a substantially rectangular cross sectional configuration, it is accordingly adapted to be received by guide surface 22e of the bearing housing 22. If, on the other hand the guide means G such as guide surfaces 22e, 22f of the bearing housing 22 are of a different configuration than shown in FIG. 2, then the guide member 52a must be appropriately shaped so that it may be engaged fully therewith. The guide member 52a of the frame member F insures that movement of the housing H will be linear along the axis of the frame member F, if at all. It is preferred that the housing H be disposed between two frame members F such that the housing H may only move vertically with respect thereto. Vertical movement of the journal bearing J may be controlled by an appropriate take-up rod 54 which may be threadedly received in threaded opening 22g formed in the upper portion of the bearing housing 22. Vertical movement of the take-up rod 54 will result in vertical movement of the journal bearing J as constrained between the frame members F. The journal bearing being thus constrained between the frame members F, results in positive location of the housing H such that it may not rotate with respect to the frame member F or with respect to the rotating headshaft 10.

Thus, the mounting assembly A of the journal bearing J of the present invention provides a new, novel technique for mounting a journal bearing J on a rotating shaft in such a way that the cost of machining complex diameters and shoulders on the shaft are eliminated and the poor sealing shown in the prior art have been overcome. The mounting assembly A provides flexibility in terms of locating the journal bearing J along the rotating headshaft 10 as well as providing ease in replacing component wear parts when such a need exists. Thus, the mounting assembly A utilizes the axial motion of the outer seal retainer means O as they are threaded onto the bearing cone C to compress the resilient compressing means M into secure frictional engagement with the rotating headshaft 10.

The foregoing disclosure and description of the invention are illustrative and explanatory thereof, and various changes in the size, shape and materials as well as in the details of the illustrated construction may be made without departing from the spirit of the invention.

I claim:

1. Mounting assembly for a journal bearing that is adapted to be disposed between a rotating headshaft and a frame member, comprising:

a bearing cone of a substantially cylindrical configuration having:

an inner cone surface to be disposed about the rotating headshaft and having an inside diameter corresponding substantially to the outside diameter of the rotating headshaft;

an outer annular bearing surface having a diameter greater than said inner cone surface;

first and second radial end portions at each end of said bearing cone; and, first and second outer annular threaded surfaces each being of a diameter greater than said inner cone surface, said first outer annular threaded surface formed between said first radial end portion and said outer annular bearing surface, and said second outer annular threaded surface formed between said second radial end portion and said outer annular bearing surface;

first and second outside seal retainer means each having an inner annular surface of a diameter substantially the same as said inner cone surface of said bearing cone, said first and second outside seal retainer means having first and second inner threaded surfaces, respectively, formed adjacent to said inner annular surface for threadedly engaging said first and second outer annular threaded surfaces, respectively, of said bearing cone, said first and second outside seal retainer means each having an inclined compressing surface formed between said inner annular surface and said inner threaded surface, respectively;

first and second resilient compression means for mounting on the headshaft between said first and second radial end portions and said inclined compressing surfaces of said first and second outside seal retainer means, respectively, for compressible engagement of said first and second resilient compression means with the headshaft upon axial threaded movement of said inner threaded surfaces of said first and second outside seal retainer means and said first and second outer annular threaded surfaces of said bearing cone, respectively, said first and second resilient compression means frictionally engaging the headshaft upon compression thereof between said first and second outside seal retainer means and said first and second radial end portions of said bearing cone, respectively, for locating said bearing cone axially along the headshaft, as desired.

2. The mounting assembly of claim 1, further including:
  a bearing housing adapted to engage the frame member, said bearing housing formed with a bore therethrough of a diameter greater than said outer annular bearing surface; and,
  bearing means disposed between and engaging said bore of said bearing housing and said outer annular bearing surface of said bearing cone.

3. The mounting assembly of claim 2, wherein:
  each of said first and second outside seal retainer means has an outer annular surface of a diameter less than the diameter of said bore of said bearing housing and greater than the diameter of said outer annular bearing surface of said bearing cone.

4. The mounting assembly of claim 2, further including:
  lubricant fill means mounted with said bearing housing to permit the addition of lubricant for and in fluid communication with said bearing means, as desired.

5. The mounting assembly of claim 2, further including:
  guide means formed with said bearing housing for mounting said bearing housing having the rotating headshaft therein for adjustable linear movement along the frame member without said bearing housing rotating.

6. The mounting assembly of claim 2, further including:
  first and second inside seal retainer means mounted with said bore of said bearing housing adjacent to and for locating said bearing means in said bearing housing.

7. The mounting assembly of claim 6, further including:
  seal means between said first inside and outside seal retainer means and said second inside and outside seal retainer means, respectively, to prevent particulate contamination of said bearing means from outside sources and for retaining lubrication within said bearing housing to insure longevity of useful life of said bearing means during rotation of the headshaft with respect to said bearing housing.

8. The mounting assembly of claim 7, wherein:
  said seal means includes seal members adapted to be disposed between said inside and outside seal retainer means, respectively.

9. The mounting assembly of claim 1, wherein:
  said outside seal retainer means includes anti-rotation means formed therewith for preventing rotation of said outside seal retainer means when threading said inner threaded surfaces of said outside seal retainer means onto said outer annular threaded surfaces of said bearing cone.

10. The mounting assembly of claim 1, wherein:
  said inner threaded surfaces of said outside seal retainer means cooperate with said outer annular threaded surfaces of said bearing cone upon engagement therebetween so as to oppose the rotation of the headshaft to insure continued positive engagement of said first and second resilient compression means with the headshaft.

11. The mounting assembly of claim 1, wherein:
  said first and second resilient compression means includes O-rings.

12. The mounting assembly of claim 1, wherein:
  said first and second outside seal retainer means are formed each having an inclined compressing surface between said inner threaded surface and said inner annular surface thereof, said inclined compressing surfaces cooperating with said radial end portions of said bearing cone to insure uniform, effective compression of said first and second resilient compression means about the headshaft.

* * * * *